(12) United States Patent
Delafoy et al.

(10) Patent No.: US 9,378,850 B2
(45) Date of Patent: Jun. 28, 2016

(54) METHOD FOR OPERATING A NUCLEAR REACTOR AND USE OF A SPECIFIC FUEL ROD CLADDING ALLOY IN ORDER TO REDUCE DAMAGE CAUSED BY PELLET/CLADDING INTERACTION

(75) Inventors: Christine Delafoy, Lyons (FR); Bruno Julien, Lyons (FR)

(73) Assignee: AREVA NP, Courbevoie (FR)

(*) Notice: Subject to any disclaimer, the term of this patent is extended or adjusted under 35 U.S.C. 154(b) by 2014 days.

(21) Appl. No.: 11/628,222

(22) PCT Filed: Jun. 1, 2004

(86) PCT No.: PCT/FR2004/001349
§ 371 (c)(1),
(2), (4) Date: Jul. 23, 2007

(87) PCT Pub. No.: WO2006/003266
PCT Pub. Date: Jan. 12, 2006

(65) Prior Publication Data
US 2008/0031399 A1 Feb. 7, 2008
US 2009/0116609 A9 May 7, 2009

(51) Int. Cl.
*G21C 7/00* (2006.01)
*G21C 3/07* (2006.01)

(52) U.S. Cl.
CPC ............ *G21C 3/07* (2013.01); *G21Y 2002/104* (2013.01); *G21Y 2004/10* (2013.01); *Y02E 30/40* (2013.01)

(58) Field of Classification Search
USPC ........................................................ 376/409
See application file for complete search history.

(56) References Cited

U.S. PATENT DOCUMENTS

| 3,772,147 | A | * | 11/1973 | Bratton et al. ................. 376/413 |
| 4,080,251 | A | * | 3/1978 | Musick ......................... 376/217 |
| 5,244,514 | A | | 9/1993 | Garde |
| 5,802,130 | A | * | 9/1998 | Mardon et al. ................. 376/457 |
| 5,828,715 | A | * | 10/1998 | Kurosaki et al. ............... 376/409 |
| 5,838,753 | A | | 11/1998 | Van Swam et al. |
| 5,844,959 | A | * | 12/1998 | Van Swam et al. ........... 376/412 |
| 6,261,516 | B1 | | 7/2001 | Jeong et al. |
| 6,544,361 | B1 | * | 4/2003 | Diz et al. ....................... 148/672 |

(Continued)

FOREIGN PATENT DOCUMENTS

| EP | 1 308 966 | 5/2003 |
| FR | 2 776 821 | 10/1999 |

(Continued)

OTHER PUBLICATIONS

Wang Lee In et al., "Assessment of core protection and monitoring systems for an advanced reactor SMART", Annals of Nuclear Energy, No. 29, (2002), p. 609-621.*

(Continued)

*Primary Examiner* — Marshall O'Connor
(74) *Attorney, Agent, or Firm* — Davidson, Davidson & Kappel, LLC (57) ABSTRACT

A method for operating a nuclear reactor in order to produce electricity, such that the reactor is controlled so that, during a transient power occurrence for at least one of: a linear power density of the nuclear fuel rod remains lower than a limit linear power density, the limit linear power density being greater than 430 W/cm, and a variation of linear power density of the nuclear fuel rod remains lower than a limit variation, the limit variation being greater than 180 W/cm.

31 Claims, 5 Drawing Sheets

(56) References Cited

U.S. PATENT DOCUMENTS

2004/0047445 A1* 3/2004 Delafoy et al. ............... 376/409
2006/0129362 A1* 6/2006 Mahe et al. ...................... 703/2

FOREIGN PATENT DOCUMENTS

| FR | 2846139 A1 * | 4/2004 |
| KR | 20030078101 | 10/2003 |
| WO | WO 01/24193 | 4/2001 |
| WO | WO0245096 A1 * | 6/2002 |
| WO | WO 2006/003266 | 1/2006 |

OTHER PUBLICATIONS

Aver'yanova, S.P. et al., Using the Offset-Power Diagram to Monitor the Local Linear Power Density of Fuel Elements in a VVER-100 Core, Jul. 2002, Plenum Publishing Corp., Atomic Energy, vol. 93, No. 1, pp. 547-553.*

Nuclear Energy Agency, Fuel Safety Criteria in NEA Member Countries, Mar. 2003, pp. 56+.*

P.M. Chantoin, E. Sartori, J.A. Turnbull, "The Compilation of a Public Domain Database on Nuclear Fuel Performance for the Purpose of Code Development and Validation", 1998, pp. 1-21.

* cited by examiner

METHOD FOR OPERATING A NUCLEAR REACTOR AND USE OF A SPECIFIC FUEL ROD CLADDING ALLOY IN ORDER TO REDUCE DAMAGE CAUSED BY PELLET/CLADDING INTERACTION

FIELD OF THE INVENTION

The present invention relates to a method for operating a nuclear reactor in order to produce electricity, the reactor comprising a core which is loaded with assemblies which comprise nuclear fuel rods, at least one rod being of the type comprising, a cladding of zirconium-based alloy and pellets of nuclear fuel based on uranium oxide, the pellets being stacked inside the cladding.

The invention is used, for example, but not exclusively, in pressurized water reactors (PWR).

BACKGROUND INFORMATION

WO-02/45 096 describes a fuel rod of the above-mentioned type. This document describes, in particular, the use of chromium oxide $Cr_2O_3$ as an additive in fuel pellets in order to promote the thermal creep thereof and limit the risks of the cladding becoming damaged owing to the phenomenon of pellet cladding interaction (PCI).

The cladding of the rod is the first barrier of containment for fission products, the other barriers being constituted by the vessel of the reactor and the concrete chamber thereof.

During normal operation, (situations referred to as class 1), and incident operation (situations referred to as class 2), the tightness of the cladding with respect to the fission products must therefore be ensured.

During a transient power occurrence which corresponds to a class 2 situation, the power reached locally in the fuel can be two to three times greater than nominal power. This rapid increase of power brings about significant expansion of the pellets. Since the thermal expansion of the pellets is greater than that of the cladding, the cladding is consequently placed in a state of traction by the pellets and the stresses at the inner surface of the cladding are increased. These stresses progressively relax by means of creeping. Furthermore, this mechanical stress takes place in a harsh chemical environment owing to the fission products, such as iodine, released by the fuel during the transient power occurrence.

This is referred to as Pellet Cladding Interaction, a phenomenon which can lead to the fracture of the cladding.

Such a fracture of the cladding is not permissible for safety reasons, since it could lead to fission products being released into the coolant system of the reactor.

As shown by the vast majority of tests on fuel rods which have been fractured by PCI in test reactors, the risk of fracture is undeniably localized: radially (at the inner surface of the cladding), axially (in the inter-pellet planes) and azimuthally (opposite the primary radial cracks of the fuel pellets).

At high power, the difference in diametral displacement between the fuel and the cladding, and the diametral overdisplacement of the pellet, are exacerbated at the ends of the pellet (deformation of the pellet brought about by the radial thermal gradient in the fuel). There is consequently a high level of stress at the inner surface of the cladding, which level may exceed the elastic limit of the material which constitutes the cladding, generally Zircaloy-4, thus causing damage to the cladding.

This mechanical load is even greater in the region of the inter-pellet planes and at the points of contact between the cladding and the edge of the primary radial cracks brought about by the fragmentation of the fuel pellets during irradiation under normal operating conditions. Furthermore, the high temperature level in the pellets promotes the release of fission products, such as iodine, which condense at the inner surface of the cladding, preferably in the region of the inter-pellet planes (zones which are less hot) and opposite the primary radial cracks of the fuel (preferred path for the discharge of the fission gases).

When the cladding fractures owing to PCI, the cladding becomes cracked and the fission gases may contaminate the coolant system.

The use of $Cr_2O_3$ as a doping additive in fuel pellets which are loaded in claddings of Zircaloy-4 has been found to be advantageous with regard to PCI.

However, the risks of fracture owing to PCI are still not reduced to a large enough extent, with the result that the level of operational flexibility of reactors using rods of this type remains too low.

SUMMARY

An objective of the invention is therefore to overcome this problem by allowing more flexible operation of a nuclear reactor.

To this end, the invention relates to a method for operating a nuclear reactor in order to produce electricity, the reactor comprising a core which is loaded with assemblies comprising nuclear fuel rods, at least one nuclear fuel rod being of the type comprising:

a cladding of completely recrystallised zirconium-based alloy comprising, by mass,
  from 0.8 to 1.3% of niobium,
  between 1000 ppm and 1700 ppm of oxygen,
  between 0 and 35 ppm of sulphur,
  between 0 and 7000 ppm in total of iron and chromium and/or vanadium,
  between 0 and 2% of tin,
  between 0 and 70 ppm of nickel,
  between 0 and 100 ppm of carbon, and
  between 0 and 50 ppm of silicon,
the balance being constituted by zirconium, with the exception of the inevitable impurities, and
pellets of nuclear fuel based on uranium oxide, the pellets being stacked inside the cladding, in which method the operation of the reactor is controlled so that, during a transient power occurrence:
the linear power density of the nuclear fuel rod remains lower than a limit linear power density, the limit linear power density being greater than 430 W/cm, and/or
the variation of linear power density of the nuclear fuel rod remains lower than a limit variation, the limit variation being greater than 180 W/cm.

According to specific embodiments, the method may comprise one or more of the following features, taken in isolation or according to any technically possible combination:
the limit linear power density is greater than 440 W/cm,
the limit variation is greater than 200 W/cm,
the limit variation is greater than 220 W/cm,
the alloy comprises by mass between 5 and 35 ppm of sulphur,
the alloy comprises between 0.03 and 0.25% in total of iron and chromium and/or vanadium,
the alloy has been subjected to annealing operations at temperatures of less than 600° C.,
the pellets comprise at least one metal oxide for increasing the thermal creep of the pellets, and in that the limit linear power density is greater than 590 W/cm, the limit linear power density is greater than 600 W/cm,
the limit linear power density is greater than 610 W/cm,
the limit linear power density is greater than 620 W/cm,
the limit variation is greater than 430 W/cm,
the limit variation is greater than 440 W/cm,
the limit variation is greater than 450 W/cm,
the metal oxide is $Cr_2O_3$,
the pellets comprise from 1200 to 2000 ppm by mass of $Cr_2O_3$,
the pellets comprise from 1450 to 1750 ppm by mass of $Cr_2O_3$,
the inner side of the cladding has been pressurised, before use, to a pressure of less than 20 bar.

The invention also relates to a use:
in a fuel rod which comprises a stack of nuclear fuel pellets based on uranium,
a cladding of completely recrystallised zirconium-based alloy comprising, by mass:
from 0.8 to 1.3% of niobium,
from 1000 to 1700 ppm of oxygen,
between 0 and 35 ppm of sulphur,
between 0 and 7000 ppm in total of iron and chromium and/or vanadium,
between 0 and 2% of tin,
between 0 and 70 ppm of nickel,
between 0 and 100 ppm of carbon, and
between 0 and 50 ppm of silicon,
the balance being constituted by zirconium, with the exception of the inevitable impurities, the cladding containing the fuel pellets,
in order to reduce the damage to the cladding caused by the phenomenon of pellet/cladding interaction.

BRIEF DESCRIPTION OF THE DRAWINGS

The invention will be better understood from a reading of the following description, given purely by way of example and with reference to the appended drawings.

DETAILED DESCRIPTION

Figure 1:
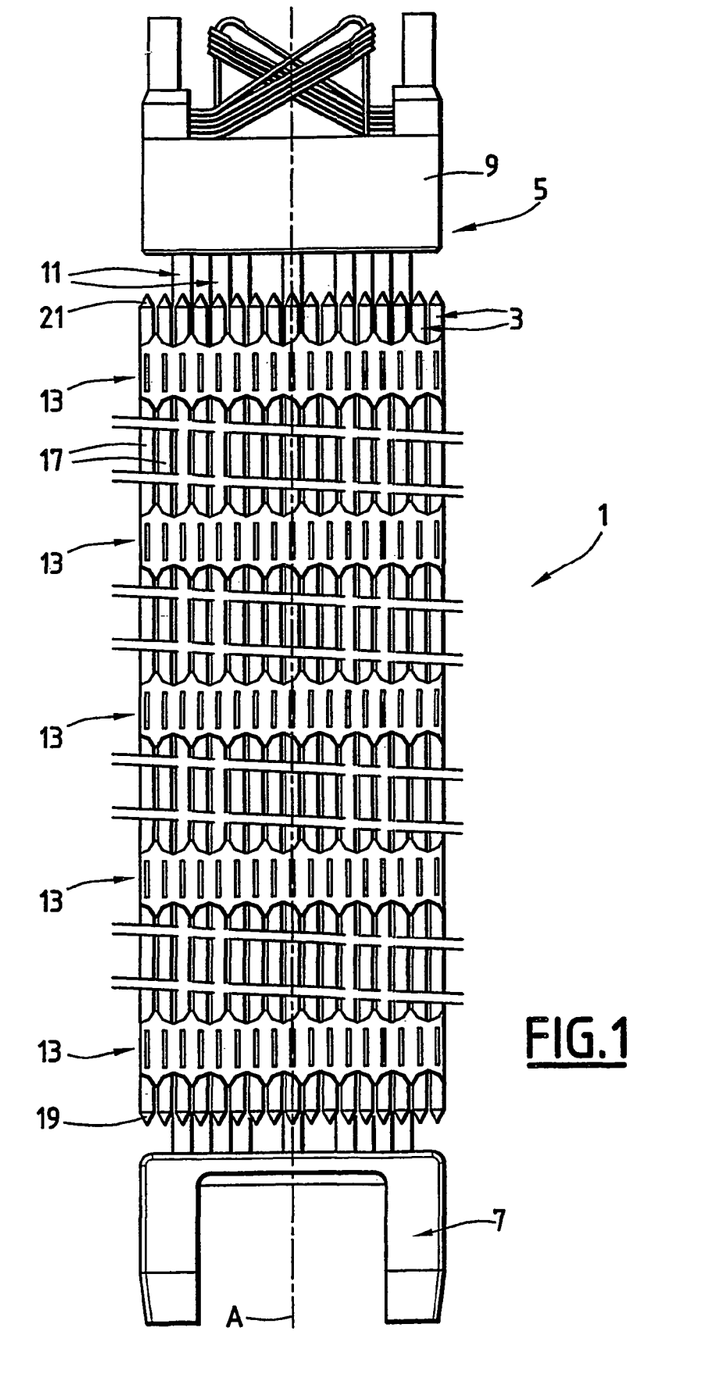
FIG. 1 is a lateral schematic view of a nuclear fuel assembly which allows the implementation of an operating method according to the invention.

FIG. 1 schematically illustrates a nuclear fuel assembly 1 for a pressurized water reactor. The water therefore performs a function of cooling and calming, for example, slowing down the neutrons produced by the nuclear fuel.

The assembly 1 extends vertically and in a rectilinear manner along a longitudinal direction A.

In conventional manner, the assembly 1 principally comprises nuclear fuel rods 3 and a structure or skeleton 5 for supporting the rods 3.

The support skeleton 5 comprises:
a bottom end-piece 7 and a top end-piece 9 which are arranged at the longitudinal ends of the assembly 1,
guide tubes 11 which are intended to receive the rods of a cluster (not illustrated) for controlling and stopping the nuclear reactor, and
grids 13 for retaining the rods 3.

The end-pieces 7 and 9 are connected to the longitudinal ends of the guide tubes 11.

The rods 3 extend vertically between the end-pieces 7 and 9. The rods 3 are arranged at the nodes of a substantially regular network having a square base where they are retained by the grids 13. Some of the nodes of the network are occupied by the guide tubes 11 and optionally by an instrumentation tube.

Figure 2:
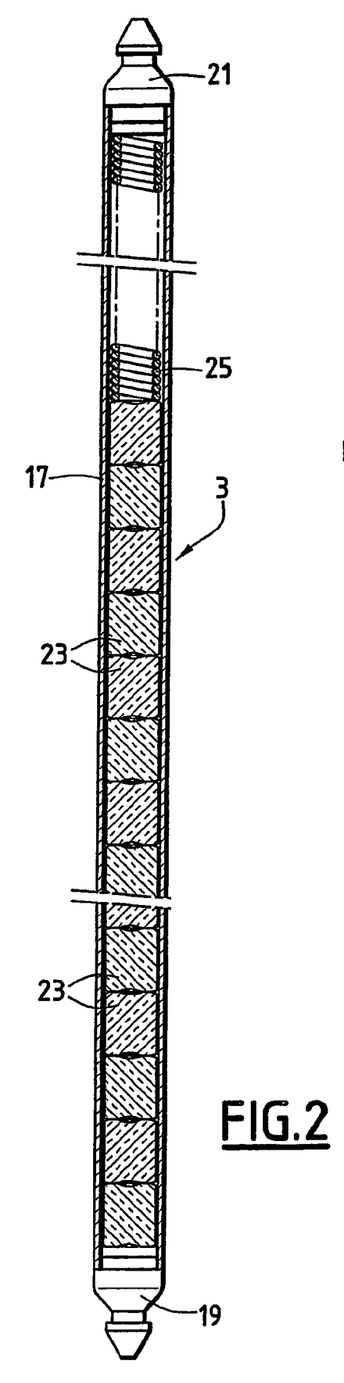
FIG. 2 is a schematic longitudinal section of a rod of the assembly of FIG. 1.

As illustrated in FIG. 2, each rod 3 comprises an outer cladding 17 that is closed by a bottom plug 19 and a top plug 21, and that contains the nuclear fuel.

These are stacked fuel pellets 23, the pellets 23 pressing on the bottom plug 19.

A helical hold-down spring 25 is arranged in the cladding 17, between the top pellet 23 and the top plug 21.

Figure 3:
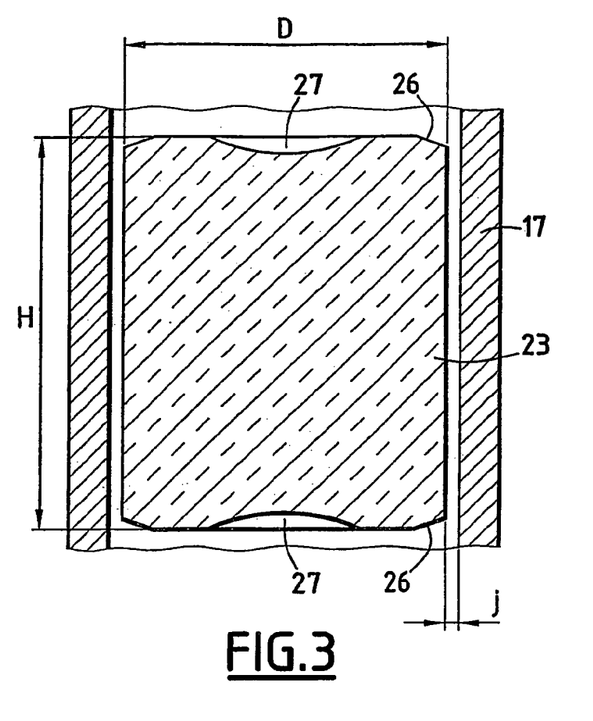
FIG. 3 is a partial schematic view illustrating the shape of a pellet of the rod of FIG. 2, drawn to an enlarged scale.

As illustrated in FIG. 3, each pellet 23 has a substantially cylindrical shape with chamfered portions 26 between the end faces and the lateral face thereof. A recess 27 in the form of a spherical dome is provided in each end face, substantially at the center thereof.

The height/diameter ratio H/D may be any value, for example, approximately 1.6, but also lower, for example, approximately 0.5.

A diametral clearance j of, for example, between 100 and 300 μm, is provided between the pellets 23 and the cladding 17.

In order to ensure good heat exchange in the rod 3 before coming into contact with the pellets 23 and the cladding 17, the fuel rod 3 is further filled with a heat-conductive gas, such as helium. The pressure of this gas also contributes to delaying the contact between the pellets 23 and the cladding 17, which contact marks the beginning of the pellet/cladding interaction.

The pressure of this gas before the assembly 1 is used will generally be between 10 and 30 bar. In an embodiment, the fuel rod 3 will be pressurized at 25 bar of helium. In some variants, the internal pressure of the rod 3 will be less than 20 bar.

The fuel of the rods 23 is, for example, uranium oxide ($UO_2$) enriched with isotope 235.

In a variant, the fuel may also comprise mixed oxide of uranium-plutonium, uranium-thorium, or uranium-rare-earth-based neutron poison (gadolinium, erbium). In particular, rods 3 of the same assembly 1 may have different nuclear fuels.

A metal oxide was added in low quantities in order to improve the viscoplastic properties of the fuel and thus reduce the consequences of the phenomenon of PCI.

In this instance, the improvement of the viscoplastic properties of the fuel was achieved by the addition of chromium oxide $Cr_2O_3$.

The addition of the chromium oxide powder $Cr_2O_3$ to that of uranium oxide can be performed, for example, by mechanical mixing so that the distribution of the doping agent $Cr_2O_3$ is homogeneous over the entire mass of the mixture. This mixture can then be subjected to various operations (precompacting, granulation, spheroidisation, lubrication) that are intended to improve the capacity thereof in terms of flowing and sintering. The lubrication step may be performed with an organic product which contains, if necessary, a metal compound, such as zinc or aluminium.

The mixture is then cold-compressed in order to form the pellets 23.

In order to promote the development of the crystalline growth, sintering of the pellets is performed under such thermodynamic conditions that the doping agent $Cr_2O_3$ cannot be reduced to the metal state Cr.

When the pellets 23 have been produced, the additive $Cr_2O_3$ will therefore not have been reduced.

Figure 4:
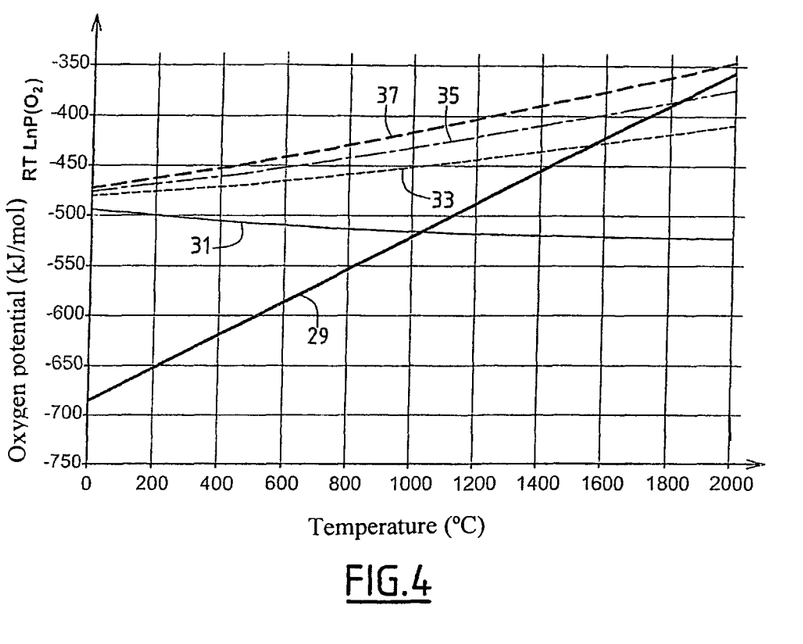
FIG. 4 is a graph illustrating the stability range of the oxide $Cr_2O_3$.

The development of the oxygen potential (in kJ/mol) corresponding to the $Cr/Cr_2O_3$ balance in accordance with the temperature is illustrated in FIG. 4 by the straight line 29. Since the stability range of $Cr/Cr_2O_3$ is above the straight line 29 of $Cr/Cr_2O_3$ balance, in practice an atmosphere is selected which allows this stability range to be complied with for the entire duration of the sintering operation. In FIG. 4, the straight lines 31, 33, 35 and 37 correspond to hydrogen atmospheres containing, respectively, 0.05; 1; 2.5 and 5% by volume of $H_2O$. For each of these atmospheres, the oxygen potential is therefore the co-ordinate at the point of intersection between the relevant straight line 31, 33, 35 or 37 and the straight line 29.

The use of a gaseous mixture of hydrogen with a water content of between 1.7 and 2.5% by volume will thus allow the $Cr_2O_3$ phase to be preserved when the sintering operation is performed up to temperatures of from 1700° C. to 1800° C.

Under these sintering conditions, the development of the crystalline growth in the matrix of $UO_2$ is directly proportional to the addition of $Cr_2O_3$ when the content by mass thereof is between 750 and 1500 ppm. This growth of grains is a direct result of the dissolution of the chromium oxide $Cr_2O_3$ in the fuel matrix. At more than 1500 ppm by mass, and owing to a lack of solubilisation of the doping agent in the $UO_2$ matrix, chromium oxide precipitates at the grain joints, leading to the activation of a second crystalline growth mechanism which leads to a quasi exponential variation in the size of the grains. The very rapid migration of the grain joints also leads to the isolation of the precipitates of $Cr_2O_3$ that have not dissolved in the grains of the $UO_2$ matrix.

In accordance with the content of chromium oxide $Cr_2O_3$ used, and therefore with the type of microstructure produced, the behaviour of the fuel in terms of creeping is modified.

Dissolving $Cr_2O_3$ in $UO_2$ brings about distortions of the crystalline network and causes hardening. However, this is compensated for by the increase in grain size that promotes the displacement of the dislocations. The larger the grains, the greater the free path of the dislocations before they encounter obstacles, such as the grain joints. Conversely, when there is a large excess of non-dissolved doping agent, the matrix contains spherical and micrometric precipitates of $Cr_2O_3$ where the dislocations become anchored. There is consequently additional hardening, on which an increase in the size of the grains has no effect. In fact a saturation of the creep speed of doped fuels is observed at more than 1750 ppm by mass of chromium oxide.

In practice, the optimum content for doping with $Cr_2O_3$ will be between 1200 ppm and 2200 ppm by mass. It will be advantageous to retain a content of 1600±150 ppm by mass which allows optimum characteristics to be obtained compared with a standard fuel based on enriched uranium, that is to say, a very significant increase in the size of the grains (greater than 45 µm) and advantageous properties for the fuel in terms of creeping.

This doping of the pellets 23 of $Cr_2O_3$ therefore increases the viscoplasticity and promotes the creeping thereof at high temperature.

During a class 2 transient occurrence, the temperature of the pellets 23 may greatly exceed 1200° C. This temperature corresponds to the activation range of thermal creeping for fuels based on uranium. Under the effect of the temperature, the material of the pellets 23 therefore has a tendency to flow towards the center of the pellets 23 that have been compressed, and therefore to fill the recesses 27. Consequently, the stresses on the lateral surfaces of the pellets 23 which remain comparatively cold (temperature of less than 1000° C.) will be reduced and the pushing action of the pellets 23 on the cladding 17 will also be reduced thereby.

During the class 2 transient power occurrence, the cladding 17 imposes a retroaction on the lateral faces of the pellets 23. Owing to the temperature range within the fuel, these lateral faces remain relatively cold and therefore remain fragile and susceptible to microcracking under the effect of the retroaction imposed by the cladding 17.

The microcracking will be all the more extensive since the energy resulting from the retroaction of the cladding 17 has to dissipate in a smaller space, that is to say, when the improvement of the viscoplastic properties of the pellets 23 occurs over a significant volume within the fuel. This mechanism of peripheral radial microcracking is also capable of reducing the local concentrations of stresses in the cladding 17 owing to a smaller degree of opening of the lips of the cracks.

In this manner, during the transient occurrence, counter reactions of the pellets 23 and the cladding 17 may be brought about, both opposing the instantaneous effects of the differential displacements of thermal origin.

For all these reasons, the above-mentioned doping of the pellets 23 reduces the mechanical component of the risk of fracture owing to PCI.

Furthermore, it reduces the chemical component of this type of fracture since the pellets 23 have a larger capacity for retaining fission gases such as iodine.

The increase in the size of the grains of the fuel doped with chromium oxide allows the capacity for retaining fission gases in the $UO_2$ matrix to be increased. In order to be released from the fuel matrix, the atoms of gas must first diffuse from inside the grains of $UO_2$ towards the grain joints where they accumulate in order to form lenticular bubbles. The interconnection of these intergranular bubbles then allows the gases to diffuse from the fuel matrix. In a structure having coarse grains, the paths for diffusion of the gases from inside the grains towards the joints are elongate and there follows a reduction of the fraction of gas released. This process is efficient only if the diffusion coefficients of the fission gases are not accelerated by the addition of the doping product.

In this regard, the use of a content of 1600 ppm by mass of $CR_2O_3$ is particularly advantageous. Furthermore, the diffusion of gaseous atoms is performed at a rate that increases with temperature, therefore with power. The use of a fuel having coarse grains doped with $Cr_2O_3$, which provides a better capacity for retention of the fission gases in the matrix, allows the concentration of harsh fission products to be reduced on the inner surface of the cladding 17, and therefore allows the risk of fracture of the cladding 17 owing to PCI to be reduced.

In the same manner, the diffusion of the gaseous atoms and their release accelerate as the combustion rate of the fuel increases. The use of a fuel having coarse grains doped with $Cr_2O_3$, which provides a better capacity for retention of the fission gases in the matrix allows the internal pressure in the rods to be limited at high combustion rates, which increase in internal pressure may compromise the integrity of the cladding 17.

The rods 3 thus have, owing to the nature of the pellets 23, satisfactory behaviour with regard to PCI.

In order to further improve the resistance of the rods 3 to this phenomenon, the claddings 17 have been produced from a specific zirconium alloy which, surprisingly, has been found to be very advantageous for this purpose.

In this instance, this is a completely recrystallized zirconium alloy comprising, by mass:
between 0.8 and 1.3% of niobium and
between 1000 and 1700 ppm of oxygen.

In exemplary variants, this zirconium alloy may further comprise between 0 and 35 ppm of sulphur, between 0 and 7000 ppm in total by mass of iron and chromium and/or vanadium, tin with a mass content of between 0 and 2%, nickel with a mass content of between 0 and 70 ppm, carbon with a mass content of between 0 and 100 ppm and silicon with a mass content of between 0 and 50 ppm.

In more exemplary variants, the alloy may comprise:
between 5 and 35 ppm by mass of sulphur and/or
between 0.03 and 0.25% by mass in total of iron and chromium and/or vanadium.

Based on this alloy, the claddings 17 were, for example, produced by a method comprising the steps of:
producing a bar of the alloy,
quenching in water after heating to a temperature of between 1000° C. and 1200° C.,
extruding a blank after heating to a temperature of between 600° C. and 800° C.,
cold rolling the blank, in at least two passes, in order to produce a tube, with annealing operations between 560° C. and 600° C., and
final recrystallization annealing between 560° C. and 600° C., all of the thermal processing operations being performed in an inert atmosphere or in a vacuum.

The use of annealing operations at temperatures lower than 600° C. and a mass content of niobium greater than 0.4% allows the presence of β niobium precipitates to be ensured, which may be found to be advantageous in some variants.

It has been found that claddings 17 which are produced in the alloy described above have a very good level of resistance to creeping under flow of rapid neutrons, thus delaying the first moment of contact between the pellets 23 and the claddings 17, that is to say, the beginning of the phenomenon of PCI.

Tests in experimental reactors have thus determined that the linear power density Pmax beyond which a fracture can be observed in a rod 3 owing to PCI is approximately 444 W/cm with an alloy according to the invention, whilst the value for Zircaloy-4 is approximately 425 W/cm. In the same manner, it has been found that the claddings 17 were able to withstand variations in the linear power density ΔPmax of approximately 253 W/cm, whilst, in the case of Zircaloy-4, the limit power variation was approximately 170 W/cm.

These values were obtained using conventional pellets in the claddings 17, that is to say, without $Cr_2O_3$.

Similar tests performed with claddings of Zircaloy-4 loaded with pellets 23 as described above allowed a maximum linear power density Pmax to be measured of approximately 530 W/cm and a variation of maximum linear power density ΔPmax of approximately 330 W/cm.

Surprisingly, the same tests performed with the rods 3 described above, that is to say, with the alloy according to the invention and the pellets 23 doped with $Cr_2O_3$, allowed a maximum linear power density Pmax to be obtained of approximately 620 W/cm and a maximum linear power variation ΔPmax of approximately 450 W/cm.

The combined use of doped pellets 23 and claddings 17 produced in the alloy according to the invention thus allows a gain to be achieved in terms of maximum linear power density Pmax and variation of maximum linear power density ΔPmax which is greater than the sum of gains achieved when the alloy according to the invention and doped pellets 23 are used separately.

It is therefore considered that the rods 3 described above, with the claddings 17 and the doped pellets 23 can withstand much more severe transient power occurrences, which allows the operational flexibility to be increased for the reactors in which assemblies 1 are loaded.

Figure 5:
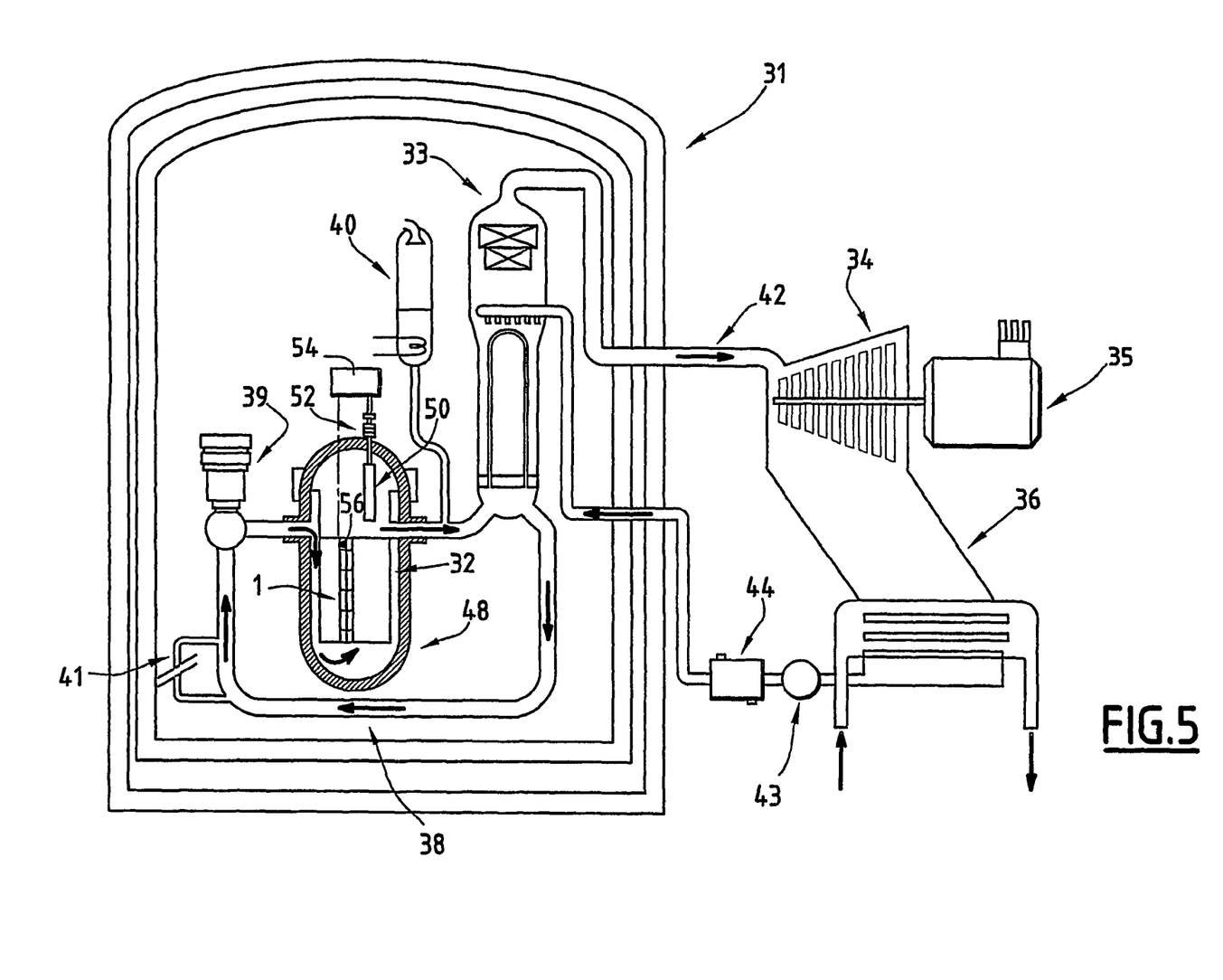
FIG. 5 is a schematic view of a nuclear reactor implementing an operating method according to the invention.

FIG. 5 illustrates a pressurized water reactor 31 of this type which conventionally comprises:
a core 32 which is contained in a vessel 48,
a vapour generator 33,
a turbine 34 which is coupled to a generator 35 of electrical energy,
a condenser 36.

The reactor 31 comprises a cooling system 38 which is equipped with a pump 39 and in which pressurized water flows, in accordance with the path which is marked with arrows in FIG. 5. This water rises in particular through the core 32 in order to be reheated at that location, cooling the core 32.

The cooling system 38 further comprises a pressurizer 40 that allows the water flowing in the cooling system 38 to be pressurized.

A chemical and volume control system 41, generally designated CVCS, is connected to the cooling system 38, in particular to provide filtration and purification of the water flowing in the cooling system 38.

The water of the cooling system 38 supplies the vapour generator 33 where it is cooled, bringing about the vaporization of water flowing in a secondary system 42.

The vapour produced by the generator 33 is channeled via the secondary system 42 towards the turbine 34 then to the condenser 36 where this vapour is condensed by indirect heat exchange with cooling water flowing in the condenser 36.

The secondary system 42 comprises, downstream of the condenser 36, a pump 43 and a heater 44.

Also in conventional manner, the core 32 comprises fuel assemblies 1 which are loaded in the vessel 48 thereof. A single assembly 1 is illustrated in FIG. 5, but the core 32 comprises, for example, 157 assemblies 1.

The reactor 31 comprises control rod clusters 50 which are arranged in the vessel 48 above specific assemblies 1. A single control rod cluster 50 is illustrated in FIG. 1, but the core 32 may comprise, for example, approximately 70 control rod clusters 50.

The clusters 50 may be displaced by mechanisms 52 under the action of control arrangement 54 in order to be inserted into the assemblies 1 which they overhang.

Conventionally, each control rod cluster 50 comprises control rods of a material which absorbs neutrons.

The vertical displacement of each cluster 50 thus allows the reactivity of the reactor 31 to be adjusted, in accordance with the introduction of the clusters 50 in the fuel assemblies 1.

Using the generator 35, the nuclear reactor 31 provides electricity to an electrical power network.

The control arrangement 54 have been adjusted in order to control the operation of the reactor 1 so that, in particular during a transient power occurrence in a class 2 situation, the linear power density P in the rods 3 of the assemblies 1 remains lower than a limit value PL, which is greater than 590 W/cm, preferably greater than 600 W/cm, more preferably greater than 610 W/cm or even greater than 620 W/cm.

In this manner, during a transient power occurrence, the linear power density P in some of the rods 3 can effectively be strictly greater than 535 W/cm, whilst being lower than the limit Pmax determined for the rods 3 according to the invention.

The effective linear power density in the rods 3 is estimated, based on measurements of operating parameters provided by sensors 56, by conventional calculation software stored in a memory of the control arrangement 54.

In the same manner, the control arrangement 54 have been adjusted so that, in particular during a transient power occurrence, the variation of the linear power density ΔP in the rods 3 remains lower than a limit variation ΔPL which is greater than 430 W/cm, preferably greater than 440 W/cm and more preferably greater than 450 W/cm. In this manner, under some operating conditions, the variation of linear power density ΔP experienced by some rods 3 may be effectively strictly greater than 330 W/cm whilst remaining lower than the limit ΔPmax determined for the rods 3 according to the invention.

The control arrangement 54 have thus been controlled, for example, by storing the above-mentioned limit values PL and ΔPL in a memory. They carry out their verification, for example, by comparing the effective values of P and ΔP with the stored threshold values PL and ΔPL.

When the control arrangement 54 detects an increase of the linear power density P or the linear power density variation ΔP above the threshold values PL and ΔPL, the control arrangement 54 can, for example, initiate a corrective action in order to stop the increase of the linear power density and/or activate an alarm.

The values PL and ΔPL are high so that the reactor 31 can be operated in a more flexible manner than was conventionally the case and thus respond more rapidly to instantaneous and significant demands of the electrical power network to which the generator 5 is connected, subjecting the assemblies 1 contained in the core 32 to significant transient power occurrences.

The combination of the alloy used in order to produce the claddings 17 and pellets 23 doped with $Cr_2O_3$ has thus allowed rods 3 to be produced which are very resistant in terms of PCI, thus reducing the risks of fracture of the claddings 17, in particular during transient power occurrences of any type.

In a variant, it was possible to use as an additive in the pellets 23, in place of or in addition to $Cr_2O_3$, $SiO_2$, $Nb_2O_5$, $Al_2O_3$, $V_2O_5$ and MgO.

Generally, it is possible to use an alloy as described above in the rods 3 in order to reduce damage to the cladding caused by the phenomenon of PCI, without using pellets 23 which comprise a metal oxide for increasing the thermal creep of the pellets. As set out above, the use of the alloy per se improves the behaviour in terms of PCI. In this case, PL is greater than 430 W/cm, and preferably greater than 440 W/cm.

ΔPL is greater than 180 W/cm, preferably greater than 200 W/cm, more preferably greater than 240 W/cm.

In order to comply with the threshold values PL and ΔPL, the control arrangement 54 can use intermediate calculation parameters.

The threshold values PL and ΔPL could thus be converted into a limit deformation energy density in the claddings 17, this energy density being defined, for example, by the formula:

$$DED = \int \sigma_{\theta\theta} d\epsilon_{\theta\theta}$$

where $\sigma_{\theta\theta}$ is the tangential stress at the inner lining of the cladding 17 and $\epsilon_{\theta\theta}$ is the tangential deformation at the inner lining of the cladding 17.

Typically, the deformation energy density limit value DEDL obtained in this manner is approximately 3 MPa, which represents an increase of approximately 50% compared with Zircaloy-4.

The use of a deformation energy density is found to be particularly advantageous since the high level of viscoplasticity of the alloy described brings about a saturation of stresses during a transient power occurrence. Consequently, the use of a deformation energy density as an intermediate parameter, rather than a limit stress, is found to be more relevant.

Figure 6:
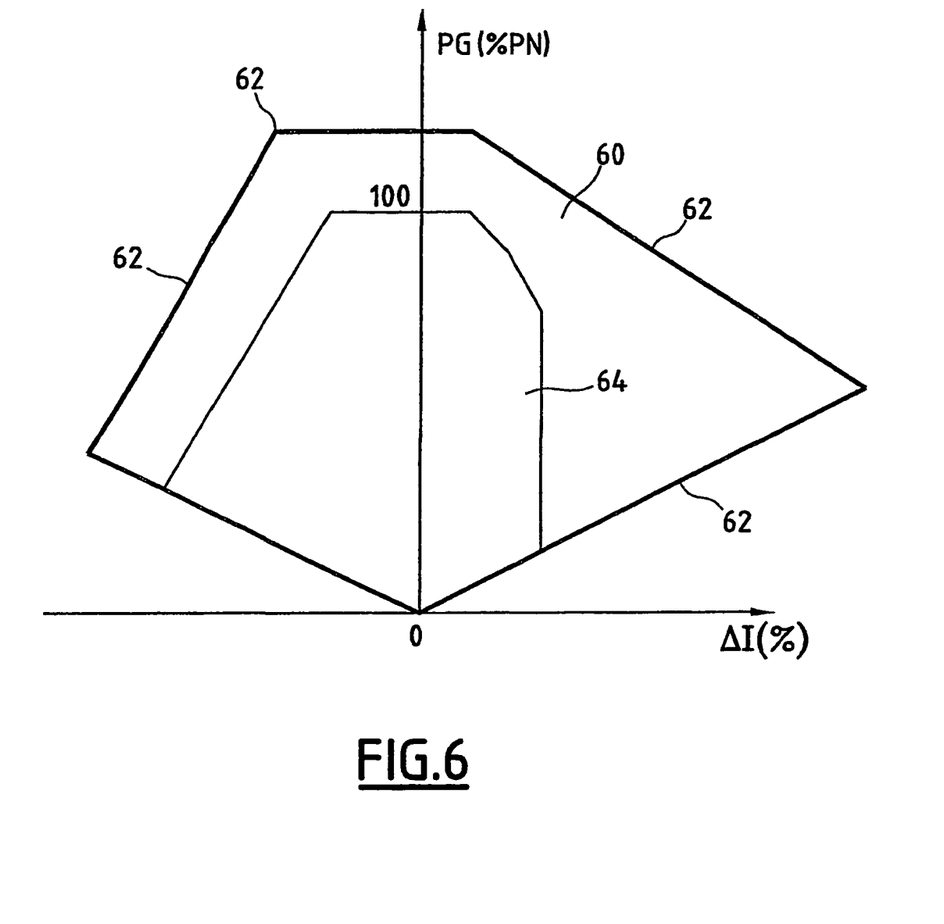
FIG. 6 is a chart illustrating the operating ranges of the reactor of FIG. 5.

The limit value DEDL was able to be translated into limit values for operating parameters of the reactor, such as, for example, the overall effective power PG expressed in percentages of the nominal power PN of the reactor 31 and the difference Δl in power between the top portion and the bottom portion of the reactor 31. A method of this type is, for example, described in the application FR-2 846 139, the content of which is incorporated herein by reference. These limit values have led to the definition of an authorized range 60 for the class 2 transient occurrences, as illustrated in FIG. 6.

The boundaries 62 of the range 60 correspond to the emergency shutdown thresholds of the reactor 31. As soon as a class 2 transient occurrence leads to departure from the range 60, the reactor 31 is caused to shut down.

In order to verify that the threshold values PL and ΔPL have not been exceeded, therefore, the effective values of the operating parameters PG and Δl are compared with the corresponding limit values.

The range 60 encompasses a range 64 which corresponds to class 1 situations.

The risk of fracture owing to PCI exists only during a significant increase of the local linear power density dissipated by the fuel pellets 23. Accidental class 2 transient occurrences which lead to the most significant increases of local linear power density, by deformation of the spatial distribution of the power, are initiated based on class 1 situations which are localised within the operating range 64 of FIG. 6. These situations are described, for example, in the application FR-2 846 139.

For current operating methods of the reactor 31 in class 1 (base operation, primary control operation, remote control operation), the values of Δl are, for example, between −15 and +15%. During a transient power occurrence which is initiated based on these operating modes, the local peaks of linear power density remain at a moderate level at the top and bottom of the core 32.

On the other hand, when the reactor 31 operates for a prolonged period of time at intermediate power (PG<92% PN for more than 8 h for each 24 h period) in order to adapt to the electricity requirement of the network, the operating point moves towards the outer zones of the range 64 of FIG. 6. These zones are characterised by values of Δl which are highly negative or positive, and which can translate into very significant variations of local linear power densities in the event of a subsequent class 2 transient power occurrence. Furthermore, such prolonged operation at intermediate power results in deconditioning of the fuel rods 3. If the power is reduced locally, there is a reduction of the temperature in the pellets 23 and the cladding 17 of each rod 3, the temperature variation in the pellets 23 being greater than that in the cladding 17. Taking into account the respective characteristics of thermal expansion of the cladding 17 and the pellets 23 of the rod 3, the radial clearance j, normally closed during operation of the reactor, opens. In this configuration, the cladding 17 creeps in terms of compression. There is consequently an increase in the mechanical loading thereof during the class 2 transient occurrence and therefore a risk of fracture owing to PCI. This risk becomes greater when the deconditioning of the fuel rod 3 is more extensive, and therefore the duration of operation at intermediate power is longer.

The boundaries 62 of the operating range 60 of FIG. 6 allow the risks of fracture caused by PCI to be eliminated during a transient occurrence of this type.

The increase of the values PL and ΔPL owing to the use of the fuel rods 3 described above also allows the reactor 31 to be used in a more flexible manner than is conventionally the case by allowing operation at intermediate power for longer periods of time.

The invention claimed is:

1. A method for operating a nuclear reactor in order to produce electricity, the reactor comprising a core that is loaded with assemblies that comprise nuclear fuel rods, at least one nuclear fuel rod being of a type comprising:
   a cladding of recrystallized zirconium-based alloy, comprising, by mass,
      from 0.8 to 1.3% of niobium,
      between 1000 ppm and 1700 ppm of oxygen,
      between 0 and 35 ppm of sulphur,
      between 0 and 7000 ppm in total of at least one of iron, chromium and vanadium,
      between 0 and 2% of tin,
      between 0 and 70 ppm of nickel,
      between 0 and 100 ppm of carbon, and
      between 0 and 50 ppm of silicon,
   a balance being constituted by zirconium, with an exception of inevitable impurities, and
   pellets of nuclear fuel based on uranium oxide, the pellets being stacked inside the cladding, the method comprising:
   controlling operation of the reactor, during a class 2 transient power occurrence, such that at least one of:
   (a) a linear power density of the nuclear fuel rod remains lower than a limit linear power density, the limit linear power density being greater than 430 W/cm and less than or equal to 444 W/cm, and
   (b) a variation of the linear power density of the nuclear fuel rod remains lower than a limit variation, the limit variation being greater than 180 W/cm and less than or equal to 253 W/cm.

2. The method as recited in claim 1 further comprising initiating a corrective action or activating an alarm when the linear power density exceeds the limit linear power density or the variation of the linear power density exceeds the limit variation.

3. The method according to claim 1, wherein the limit linear power density is greater than 440 W/cm.

4. The method according to claim 1, wherein the limit variation is greater than 200 W/cm.

5. The method according to claim 4, wherein the limit variation is greater than 220 W/cm.

6. The method according to claim 1, wherein the alloy further comprises:
   between 5 and 35 ppm of sulphur by mass.

7. The method according to claim 1, wherein the alloy comprises between 0.03 and 0.25% in total of at least one of iron, chromium and vanadium.

8. The method according to claim 1, wherein the recrystallized zirconium alloy has been subjected to at least one annealing operations at temperatures of less than 600° C.

9. The method according to claim 1, wherein an inner side of the cladding is pressurized, before use, to a pressure of less than 20 bar.

10. The method as recited in claim 1 wherein the controlling includes using a deformation energy density for ensuring that the linear power density of the nuclear fuel rod remains lower than the limit linear power density, or the variation of the linear power density of the nuclear fuel rod remains lower than the limit variation.

11. The method according to claim 1, wherein the pellets include the metal oxide $Cr_2O_3$.

12. The method according to claim 11, wherein the pellets comprise from 1200 to 2000 ppm by mass of $Cr_2O_3$.

13. The method according to claim 12, wherein the pellets comprise from 1450 to 1750 ppm by mass $Cr_2O_3$.

14. A method for operating a nuclear reactor in order to produce electricity, the reactor comprising a core that is loaded with assemblies that comprise nuclear fuel rods, at least one nuclear fuel rod being of a type comprising:
   a cladding of recrystallized zirconium-based alloy, comprising, by mass,
      from 0.8 to 1.3% of niobium,
      between 1000 ppm and 1700 ppm of oxygen,
      between 0 and 35 ppm of sulphur,
      between 0 and 7000 ppm in total of at least one of iron, chromium and vanadium,
      between 0 and 2% of tin,
      between 0 and 70 ppm of nickel,
      between 0 and 100 ppm of carbon, and
      between 0 and 50 ppm of silicon,
   a balance being constituted by zirconium, with an exception of inevitable impurities, and
   pellets of nuclear fuel based on uranium oxide, the pellets being stacked inside the cladding, the pellets including at least one metal oxide for increasing a thermal creep of the pellets, the method comprising:
   controlling operation of the reactor, during a class 2 transient power occurrence, such that at least one of:
   (a) a linear power density of the nuclear fuel rod remains lower than a limit linear power density, the limit linear power density being greater than 430W/cm and less than or equal to 620 W/cm, and
   (b) a variation of the linear power density of the nuclear fuel rod remains lower than a limit variation, the limit variation being greater than 180 W/cm and less than or equal to 450 W/cm.

15. The method as recited in claim 14 further comprising initiating a corrective action or activating an alarm when the linear power density exceeds the limit linear power density or the variation of the linear power density exceeds the limit variation.

16. The method as recited in claim 14, wherein the limit linear power density is greater than 440 W/cm.

17. The method as recited in claim 14, wherein the limit variation is greater than 200 W/cm.

18. The method as recited in claim 14, wherein the limit variation is greater than 220 W/cm.

19. The method as recited in claim 14, wherein the alloy further comprises:
   between 5 and 35 ppm of sulphur by mass.

20. The method as recited in claim 14, wherein the alloy comprises between 0.03 and 0.25% in total of at least one of iron, chromium and vanadium.

21. The method as recited in claim 14, wherein the recrystallized zirconium alloy has been subjected to at least one annealing operations at temperatures of less than 600° C.

22. The method as recited in claim 14, wherein the limit linear power density is greater than 590 W/cm.

23. The method as recited in claim 14, wherein the limit linear power density is greater than 600 W/cm.

24. The method as recited in claim 14, wherein the limit linear power density is greater than 610 W/cm.

25. The method as recited in claim 14, wherein the limit variation is greater than 430 W/cm.

26. The method as recited in claim 14, wherein the limit variation is greater than 440 W/cm.

27. The method as recited in claim 14, wherein the metal oxide is $Cr_2O_3$.

28. The method as recited in claim 27, wherein the pellets comprise from 1200 to 2000 ppm by mass of $Cr_2O_3$.

29. The method as recited in claim 28, wherein the pellets comprise from 1450 to 1750 ppm by mass $Cr_2O_3$.

30. The method as recited in claim 14, wherein an inner side of the cladding is pressurized, before use, to a pressure of less than 20 bar.

31. The method as recited in claim 17 wherein the controlling includes using a deformation energy density for ensuring that the linear power density of the nuclear fuel rod remains lower than the limit linear power density, or the variation of the linear power density of the nuclear fuel rod remains lower than the limit variation.

\* \* \* \* \*